G. J. TROMPETER.
SAUSAGE TWISTING MACHINE.
APPLICATION FILED NOV. 16, 1906.
973,086.
Patented Oct. 18, 1910.
6 SHEETS—SHEET 1.
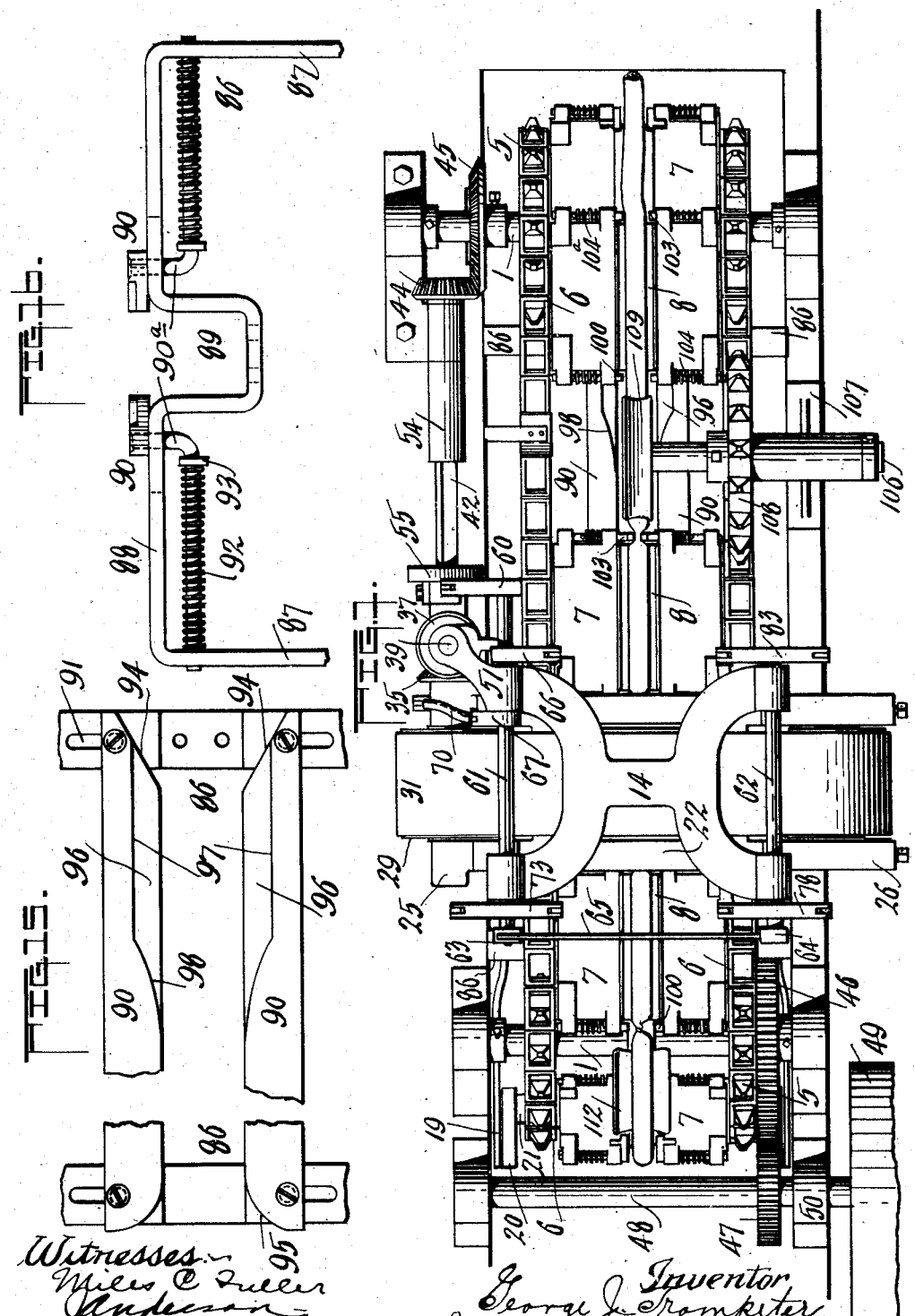

G. J. TROMPETER.
SAUSAGE TWISTING MACHINE.
APPLICATION FILED NOV. 16, 1906.
973,086.
Patented Oct. 18, 1910.
6 SHEETS—SHEET 2.
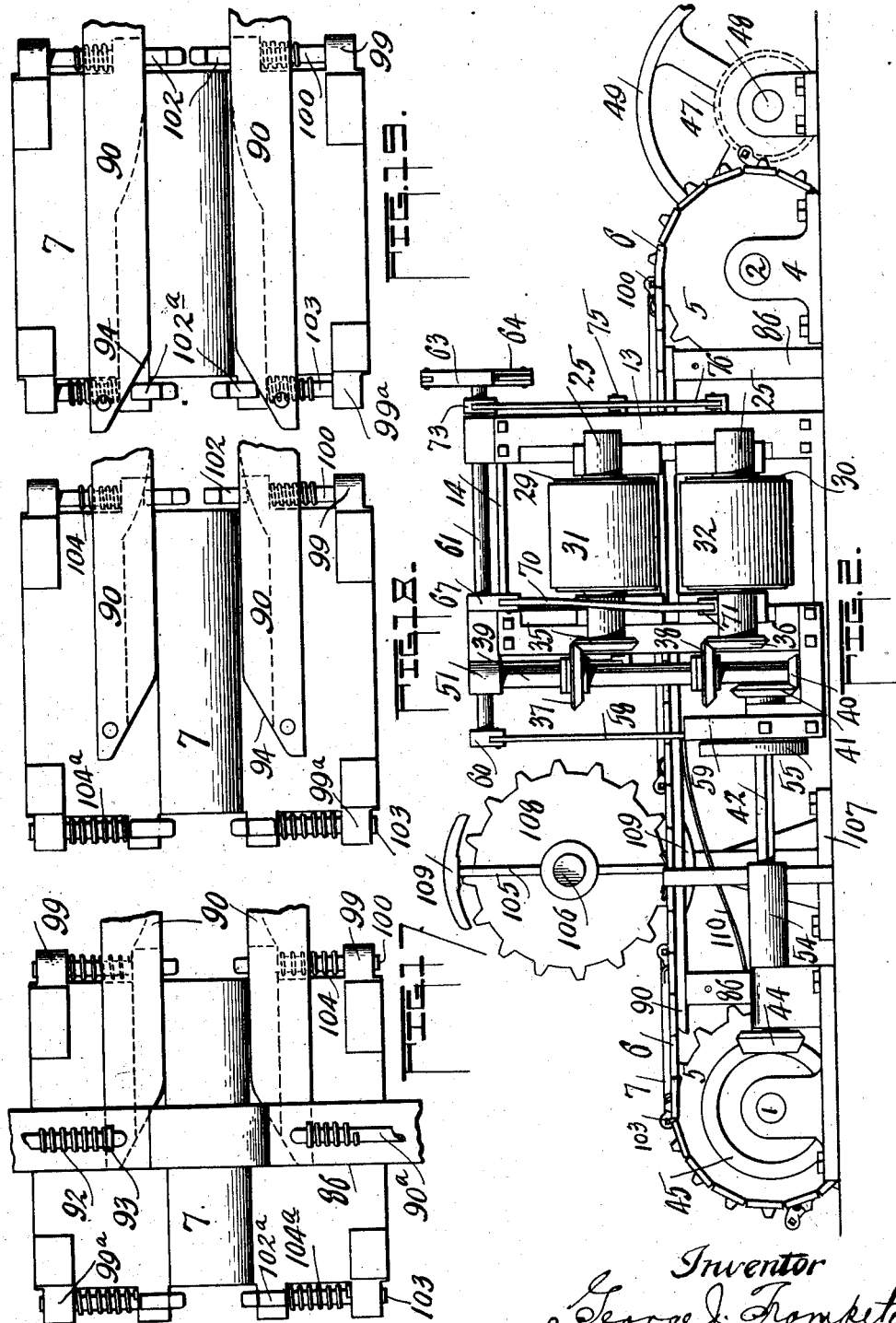

G. J. TROMPETER.
SAUSAGE TWISTING MACHINE.
APPLICATION FILED NOV. 16, 1908.
973,086.
Patented Oct. 18, 1910.
6 SHEETS—SHEET 3.
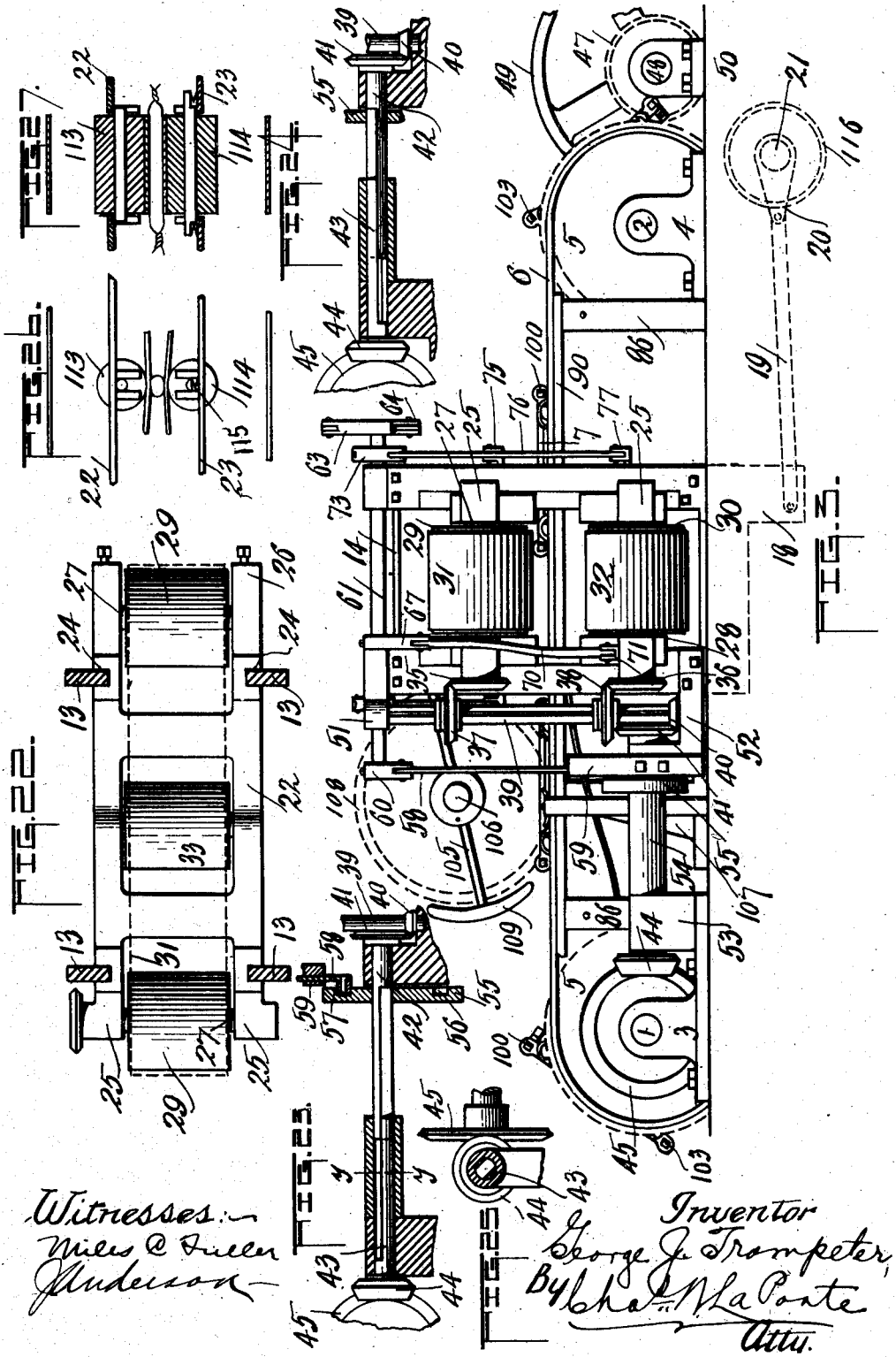
Witnesses:
Niles C. Fuller
Anderson
Inventor
George J. Trompeter,
By Chas. N. La Ponte
Atty.

G. J. TROMPETER.
SAUSAGE TWISTING MACHINE.
APPLICATION FILED NOV. 16, 1906.
973,086.
Patented Oct. 18, 1910.
6 SHEETS—SHEET 4.
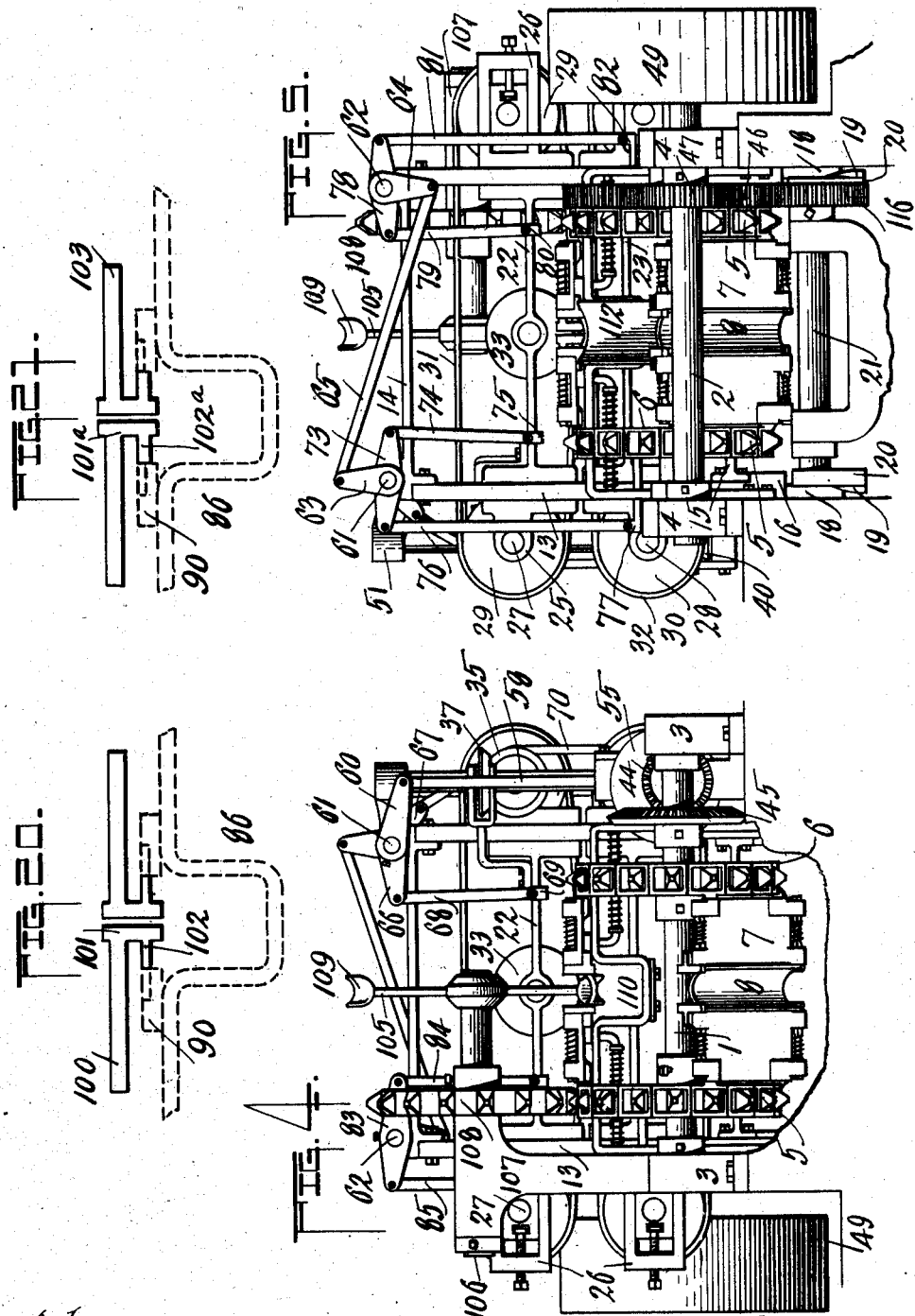

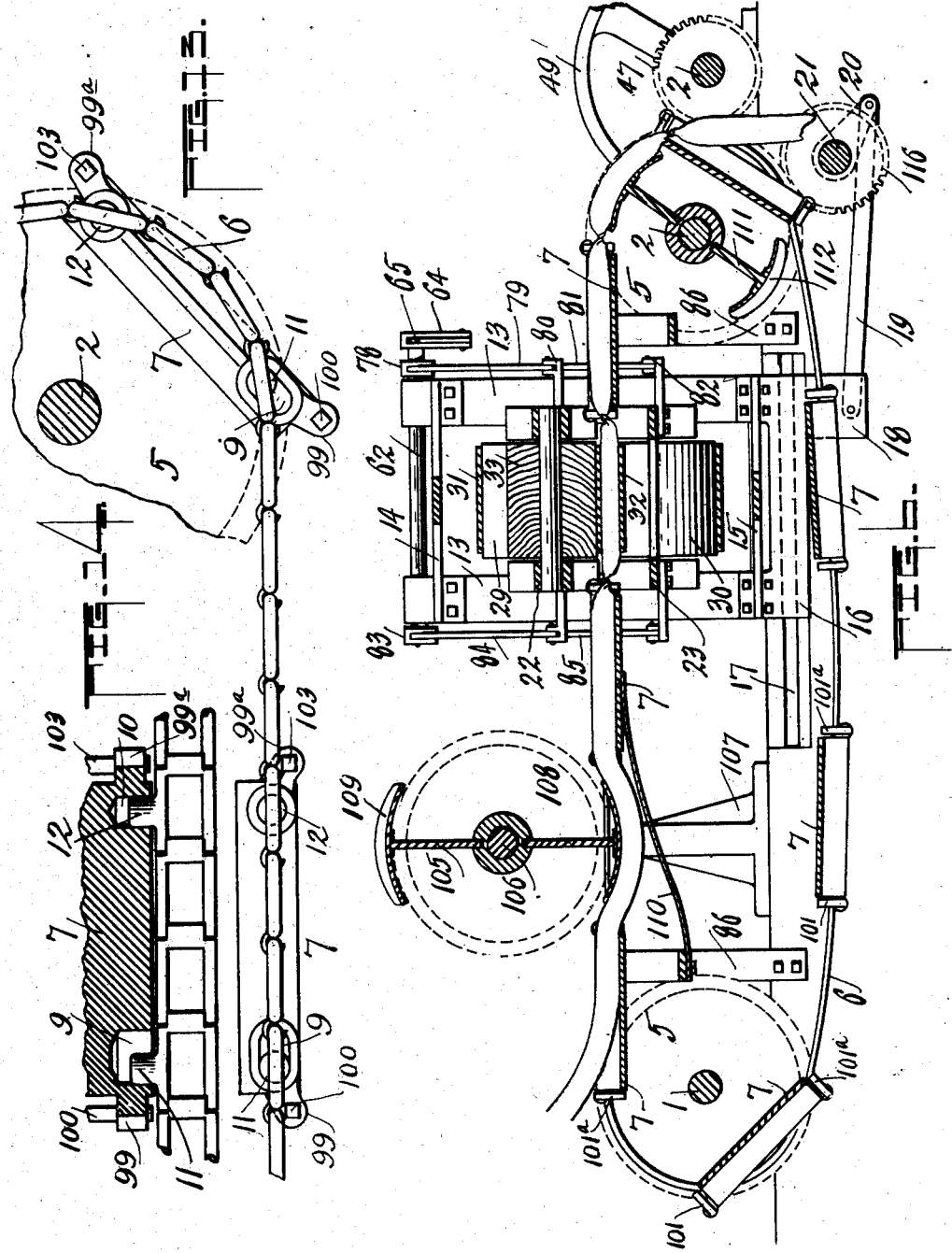

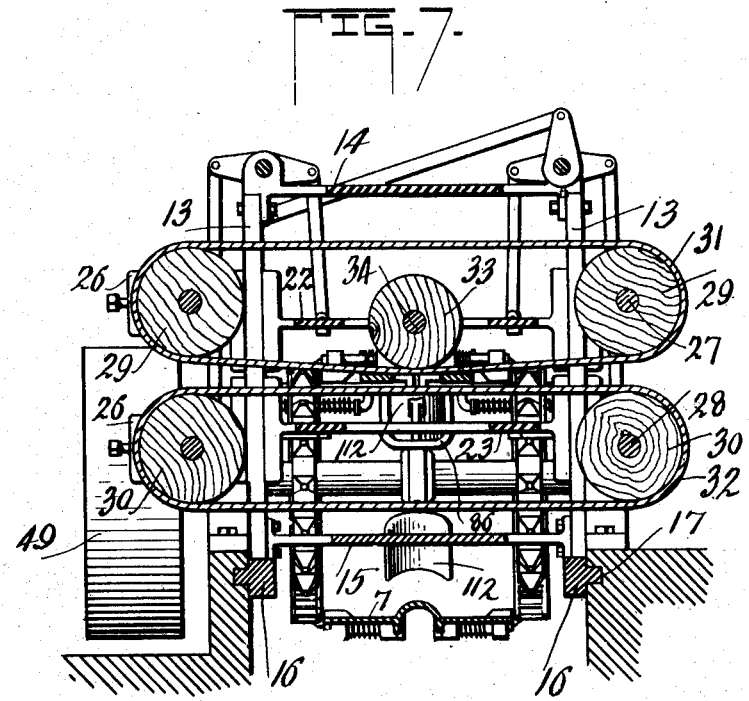
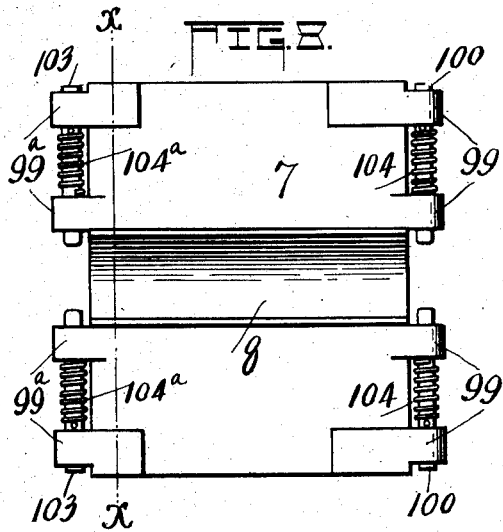
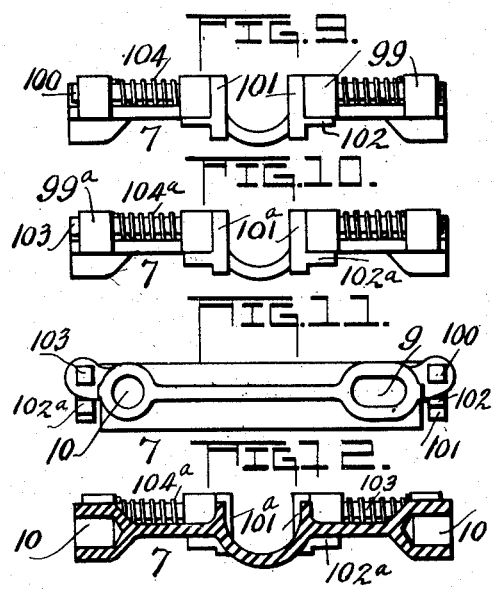

UNITED STATES PATENT OFFICE.

GEORGE J. TROMPETER, OF PEORIA, ILLINOIS.

SAUSAGE-TWISTING MACHINE.

973,086.  Specification of Letters Patent.  Patented Oct. 18, 1910.

Application filed November 16, 1906. Serial No. 343,768.

*To all whom it may concern:*

Be it known that I, GEORGE J. TROMPETER, a citizen of the United States, residing at Peoria, in the county of Peoria and State of Illinois, have invented certain new and useful Improvements in Sausage-Twisting Machines; and I do hereby declare that the following is a full, clear, and exact description of the invention, which will enable others skilled in the art to which it appertains to make and use the same.

This invention has reference to a machine for automatically twisting and producing links of uniform lengths in stuffed sausage casings or guts.

The object of the present invention is to effect mechanically all the manipulations required in producing linked Vienna sausage from a continuous casing or gut, in order to save time and expense in the form of wages, etc., and furthermore, to produce sausages of exactly uniform length, an aim which, with manual labor could hitherto, but inadequately, be attained, because with hand work only the judgment of the eye could be relied upon.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accampanying drawings, in which:—

Figure 1 is a top plan view of the machine embodying my improvements showing the stretching device in the act of stretching the sausage casing and the twisting mechanism moving forward with the conveyer or carrier and operating to twist a portion of said sausage casing; Fig. 2 is a side elevation of one side of my machine showing the parts in the position as shown in Fig. 1; Fig. 3 is a side elevation similar to that shown in Fig. 2 with the exception that the twisting mechanism is at a point where the device for engaging the casing is about to engage the same; Fig. 4 is an end view looking into the machine at the left hand end of Fig. 2; Fig. 5 is an end view of the machine looking in at the right hand end of Fig. 2; Fig. 6 is a central and vertical longitudinal cross section through the machine; Fig. 7 is a transverse cross section of the machine taken through the casing and twisting mechanism; Fig. 8 is an enlarged plan view of a plate or rest of which a series are employed in the endless conveyer or carrier; Fig. 9 is an end view of the forward end of the plate shown in Fig. 8, which is the right hand end of said plate looking at Fig. 8; Fig. 10 is a view of the opposite end of said plate; Fig. 11 is a side elevation of the plate shown in Fig. 8; Fig. 12 is a cross section on the line X—X of Fig. 8; Fig. 13 is an enlarged detail and side elevation of a portion of one of the chains forming the endless conveyer or carrier to which the plates which are shown in Fig. 8 are attached and also showing how the plates ride on the chains during the movement of said chains around their sprocket wheels; Fig. 14 is a detail in plan of a portion of one of the chains forming the endless conveyer or carrier and in cross section a portion of one of the plates and the manner of connecting the plates and chains; Fig. 15 is an enlarged detail in plan, partly broken away of a cam-track with which portions of the plates engage for the purpose of gripping the sausage casing preparatory to and during the twisting of the same; Fig. 16 is a view of one end of what is shown in Fig. 15; Fig. 17 is a bottom plan view of a portion of the cam-track and one of the plates, the same being in the position just prior to the gripping means on said plate engaging with the cam-track; Fig. 18 is a view similar to Fig. 17, except that the gripping means on the plate are shown being operated by the cam; Fig. 19 is a view similar to Figs. 17 and 18 with the exception that the rear grippers of the plate are being engaged by the cam of the track; Fig. 20 is an end elevation showing in outline the forward grippers engaging certain cam portions of the cam-track, and its support being shown in dotted lines; Fig. 21 is an end elevation in outline of the rear grippers engaging certain cam portions of the cam-track; the cam-track and its support being shown in dotted lines; Fig. 22 is a plan view of the frame supporting rollers over which a belt forming a part of the twisting devices, runs; Fig. 23 is a sectional detail of parts which control the raising and lowering of the frames supporting the belts which form a part of the twisting mechanism; Fig. 24 is a view similar to Fig. 23, except that the parts are shown in different positions; Fig. 25 is a sectional view as the same would appear on the line Y—Y of Fig. 23; Fig. 26 is an end elevation showing a modified form of idlers used in connection with the twisting belts, and Fig. 27 is a vertical cross section through Fig. 26.

Like numerals of reference indicate corresponding parts throughout the figures.

The base or support for the standards or uprights of the machine may be constructed in any suitable way or a suitable foundation may be provided for supporting such working parts of the machine. From the drawings, it will be intimated that a suitable ground base was provided in which parts of the mechanism would work. At the opposite ends of the machine are provided two transverse shafts 1 and 2, their opposite ends journaled in suitable standards or uprights 3 and 4. Spaced apart on the shafts 1 and 2 are provided sprocket wheels 5 over which run suitable sprocket chains 6, forming a part of the endless conveyer or carrier referred to.

7 denotes a series of plates or rests which are connected at intervals with the chains 6 and suitably spaced apart thereon. These plates may be of suitable length and the central portions thereof are provided with longitudinal depressed and approximately semi-circular grooves or channels 8, as shown. The sides of the said plates at the opposite forward ends thereof are provided with the elongated slots 9 and the sides of said plates at the opposite rearward ends thereof are provided with the openings 10. The slots 9 and openings 10 forming bearings in which lugs 11 and 12 respectively, of certain links of the chains 6 are carried, see Figs. 13 and 14. When the plates 7 and the chains are assembled, they together form the conveyer or carrier referred to. Were it not for the provision of the slots 9 in the plates, the said plates and chains would not adapt themselves to the sprocket wheels at the opposite ends of the machine around which the said chains are carried, but constructing the said plates as shown, it will be seen that as the chains 6 follow the circumference of the sprocket wheels 5, the plates through the provision of the slots 9 may slide on the lugs 11 and thereby allow the chains to travel around their sprocket wheels without cramping or destroying the effectiveness of the device.

The endless conveyer or carrier just referred to, travels between a reciprocally mounted support or frame upon which is suitably mounted certain twisting mechanism and driving devices for operating the same. The support just referred to comprises four standards 13, connected at their upper and lower ends by the cross frames or braces 14 and 15, and the lower ends of the standards 13 are connected with longitudinally disposed sills or braces 16, provided with portions which are slidable in grooves 17 in the opposite sides of the base of the machine, whereby the sills and standards may be reciprocated by suitable means. At one end of the sills or braces 16, they are provided with depending portions 18 with which are pivotally connected connecting rods 19, which, at their opposite ends are pivotally connected with cranks 20 carried by a shaft 21. Thus it will be seen that when power is imparted to the shaft 21, the cranks 20 will operate to reciprocate the connecting rods 19 and thereby impart a similar movement to the standards 13, through the connections just described.

Reciprocally mounted on the standards 13 are a pair of overlying frames 22 and 23, which are provided with grooves or slots 24 see Fig. 22 cut in from their opposite sides to coincide with and ride up and down upon the standards 13. These frames 22 and 23 are provided at their opposite ends with boxings 25 and 26 in which are journaled the opposite ends of shafts 27 and 28 on which are carried rollers or pulleys 29 and 30 around which travel belts 31 and 32, which, together form the twisting mechanism referred to. Provision being made in connection with the boxings at one end of the frames 22 and 23 for serving as a tightener for taking up the slack in the belts whenever it is so desired. The frames 22 and 23 are suitably connected with power devices to be described, for reciprocating the same upon the standards 13, whereby at intervals, the belts 32 and 31 may be brought in proximity to each other and separated for the purpose of engaging with the sausage casing for twisting the same at the proper time during the conveying of said sausage casing through the machine by the conveyer or carrier in a manner to be described.

In Figs. 4, 5, 6 and 7, an idler wheel 33 is shown under which the belt 31 is carried, as best seen in Figs. 6 and 7 and said idler wheel is carried on a short spindle 34, the opposite ends of which are suitably journaled in the frame 22, as best seen in Figs. 6 and 22. The object of the idler 33 is to hold the belt 31 in positive engagement with the sausage casing through the operation of the belts 31 and 32 for properly rotating the said sausage casing and producing twists at intervals therein for forming the links described. On corresponding ends of one end of the shafts 27 and 28, carrying the rollers 29 and 30, are bevel gears 35 and 36, see Figs. 2 and 3 which mesh with bevel gears 37 and 38 which have a spline and groove connection with a vertically disposed shaft 39, so that as the frames 22 and 23 are raised and lowered, the bevel gears 37 and 38 will move up and down on the shaft 39, so as to at all times impart power from the shaft 39 to the shafts 27 and 28. The shaft 39, at its lower end carries a bevel pinion 40 driven by a bevel gear 41 on one end of a shaft 42 which is rotatably and slidably connected with a shaft 43 carrying a bevel pinion 44 in mesh with a bevel gear 45 carried on the shaft 1 which is suitably driven by means of the chains 6 forming a part of the endless conveyer or carrier, the means of transmitting motion to said conveyer or carrier comprising a gear wheel 46 on the shaft 2 in mesh with a pinion 47 carried on one end of a driving shaft 48 which also carries a driving pulley 49 which may be driven from any suitable source of power. The shaft 48 having its opposite ends journaled in boxings 50 supported on the base which supports the working parts of the machine. The upper end of the shaft 39 is journaled in a bearing 51 connected with or forming a part of the upper connecting frame 14 of the standards 13, and the lower end of the said shaft is journaled in a suitable boxing 52, secured at the lower end of one of the standards 13, which boxing also serves as a bearing for the inner end of the shaft 42, as shown in Figs. 23 and 24, and the shaft 43 with which the shaft 42 has a slidable connection, has a bearing at its forward end in a suitable boxing 53, and the said shaft is also carried in a sleeve 54.

On the shaft 42 adjacent to its bearing in the boxing 52 is carried a cam shaped disk 55 in one face of which is arranged a cam slot or groove 56, see Fig. 23. Although a face view of this disk has not been shown, it is understood that the slot or groove 56 may be of oval or any suitable shape for the purpose of accomplishing the result herein desired. In this cam slot or groove 56 is carried a roller 57, attached to the lower end of a connecting rod 58 which has movement for a portion of its length in a guide block 59, suitably secured to the boxing 52; this connecting rod 58 extends up a suitable distance and is pivotally connected at its upper end to a crank arm 60 carried on one end of a shaft 61 suitably journaled in a boxing secured at the upper end of the frame composed of the standards 13 and parts heretofore described. On the opposite side of the machine is a shaft 62 similar in all respects to the shaft 61 and is carried substantially in the same manner, and these two shafts are suitably connected with each other, by means of a crank arm 63 on the shaft 61, a crank arm 64 on the shaft 62 with which is connected a reach bar or lever 65, so that when motion is imparted to the shaft 61 through the operation of the cam disk 55 and the parts connected therewith, motion will be also transmitted through the crank arms 63 and 64 and the reach 65 to the shaft 62.

It is through the medium of the shafts 61 and 62 and the mechanism for operating the same together with the parts which will now be described, that I am enabled to raise and lower the frames 22 and 23 which carry the belts 31 and 32. On the shaft 61 at or near the end with which the crank arm 60 is connected, I attach crank arms 66 and 67. With the former is connected a bar 68 which has its lower end connected with the frame 22 as at 69 and with the latter is connected a bar 70 which has its lower end connected with the frame 23, as at 71, see Figs. 2 and 3. On the opposite end of the said shaft 61 is carried a double crank arm 73 with the inner end of which is connected a bar 74 which has its lower end connected at 75 with the frame 22, and connected with the outer end of said crank arm 73 is a bar 76 which has its lower end connected at 77 with the frame 23, best seen in Fig. 5. On the end of the shaft 62 to which is attached the crank arm 64, I also attach a double crank arm 78 with the inner end of which is connected a bar 79 which has its lower end connected with the frame 22 at 80, and connected with the outer end of the crank arm 78 is a bar 81 which has its lower end connected at 82 with the frame 23, see Fig. 5. On the opposite end of the said shaft is carried a double crank arm 83 in all respects similar to the crank arm 78 and with the inner and outer ends thereof are connected bars 84 and 85 which have a similar connection with the frames 22 and 23, as do the bars 79 and 81.

From the foregoing description, it will be seen that when the cam disk 55 is rotated, which will reciprocate the lever 59, that motion will be imparted to the shafts 61 and 62, through the connections described, and by means of the crank arms and bar connections between the same and the frames 22 and 23 that said frames will be raised and lowered. That is to say, the operation of such crank arms and bars will lower the upper and raise the lower frames 22 and 23 simultaneously for the purpose of causing the belts to engage the sausage casing for twisting the same, such twisting being done by the movement of the belts 31 and 32 through the gearing heretofore described.

When the support which carries the belts 31 and 32 is at its extreme forward position in the machine, as the same is moved from this point inwardly the cam disk is so timed with respect to the operation of other parts of the machine that the frames 22 and 23, through the connections described, will be brought in proximity to each other for the purpose of causing the belts 31 and 32 to engage with a sausage casing being conveyed through the machine by means of the endless conveyer or carrier in a manner to be described, and the formation of the cam disk 55 is such that the frames will be held in the position just described through the travel of the frame supports in the machine until the said support arrives at or near the end of its movement when the cam disk will operate the parts connected therewith and with the frames for the purpose of separating the same. In Fig. 2, the support for the frames 22 and 23 is at or near the end of its movement and the belts 31 and 32 are shown in the position just prior to the frames 22 and 23 being separated, while in Fig. 3, the support for the frames 22 and 23 is at the forward end of its movement and the belts 31 and 32 are shown separated, just prior to the starting of the frame and bringing of the belts in proximity to each other, for the purposes just described.

At or near the opposite ends of the machine are supported a pair of frames 86 which are in all respects similar to each other, the detail of which would be best seen in Figs. 15 and 16 of the drawings. These frames have the opposite vertical portions 87, which at their lower ends are secured to the bed, see Fig. 6, and after extending up a suitable height, are bent inwardly as at 88 and extend transversely part way across the machine and then downwardly and transversely forming a channel 89 between the matching faces of the inner vertical portions thereof. To the transverse portions 88 at or near their inner ends are connected the opposite ends of bars 90 which serve as the cam track referred to. To the opposite ends of said bars are connected rods $90^a$ which extend down through elongated slots 91 in the frames 86 and then outwardly, as seen in Fig. 16, where the outer ends pass through portions 87 of said frames. On said rods are carried coil springs 92 which bear at one end against the vertical portions 87 of the frames, and at their opposite ends against collars 93 on the rods $90^a$. The springs on the rods $90^a$, serve to yieldingly hold the bars 90 in the position shown in the drawings and are especially provided for purposes which will be further explained. The forward ends of the bars 90 are beveled as at 94 and the opposite ends thereof are rounded as at 95, while the body portions of the said bars have a portion of their length from the forward ends, chamfered as at 96, forming the off sets 97 and the beveled or rounded faces 98, serving a purpose which will be described.

Referring again to the plates, 7, which are attached in the manner described, to the chains 6, there is arranged at the forward end rear ends of the plates, parts which are adapted in the passage of the plates through the machine and over the cam track described, to engage with portions of the said track, whereby the sausage casing is engaged for the purpose of holding the same during the operation of the belts, to produce twists in the sausage casing, substantially as seen in Figs. 1 and 6. At the forward end of each plate and extending through a pair of bosses 99 which are suitably spaced apart upon the opposite sides of the groove 8 in the said plate, are carried bars or rods 100, the inner ends of said bars being shaped somewhat as seen in Fig. 20, which are provided with the depending portions 101 having laterally extended lugs 102. At the opposite ends of the said plates are carried bars or rods 103, which in most respects are similar to those indicated at 101, and carried through bosses $99^a$, duplicates of those indicated as 99. The inner ends of the bars or rods 103 are substantially the same as those indicated as 100, being provided with the depending portions $101^a$, and the laterally extended lugs $102^a$; the difference in the lugs 102 and $102^a$, being, that the lugs $102^a$ have a greater depth than those indicated as 102. As the plates 7 move over the track composed of the bars 90, the lugs 102 of the bars or rods 100, will ride over the chamfered portions 96 of the said bars until the end of the lugs engage the curved portions 98 thereof and by such engagement force the inner or depending ends of the bars or rods 100 in proximity to each other substantially as shown in Fig. 20, and they will be retained in this position until the lugs 102 ride off of the curved ends 95 of the said bars, when springs 104 on the rods 100, will return them to their original position, being that position shown in Figs. 8 and 9. As the rear ends of the plate coincide with the forward ends of the bars 90 of the cam track the lugs $102^a$, which are of greater depth than those indicated as 102, will engage with the beveled faces 94 of the bars 90 and by such engagement force the inner depending ends $101^a$ of the bars or reaches 103 in proximity to each other, substantially as seen in Fig. 21. They will be retained in this position through the movement of the plates along the bars 90, until the lugs $102^a$ ride off of the curved ends 95 of the bars 90, when they will be returned by means of the springs $104^a$, to their original positions, being the positions shown in Figs. 8 and 10. It will be seen that by making the lugs 102 and $102^a$ of different depths that the former set of lugs can only be operated by the curved portions 98 of the bars of the cam track and that the latter can only be operated by the beveled portions 94 of the bars of said cam track.

The portions 101 and $101^a$ of the bars or rods 100 and 103 serve as jaws and have for their object to engage the sausage casing as the plates 7 travel through the machine and such engagement of the sausage casing continues until after the twisting of the same by the twisting mechanism referred to. In this connection I will now describe the function of the springs 92 on the rods 90ª, to which the opposite ends of the bars 90 of the cam track are connected. In the passage of the plates 7 and sausage casing through the machine, it might occur that a hard substance such as bone would be found in the sausage casing together with the sausage meat contained therein, and should it happen, that the jaws of the bars or rods 100 or 103 engage that portion of the casing, it would be readily seen that unless some means were provided to allow the jaws to separate themselves to provide for such emergency, that there will be a possibility of the lugs becoming broken or bent or the track twisted out of its shape, but to guard against anything of the kind happening, the rods 90ª are provided with the spring 92, and said rods operate through the slots 91 in the supports referred to, so that should the jaws of the bars or rods 100 or 103 engage with a hard substance in the casing, the bars 90 of the track would give slightly, and be again returned by means of the springs, as shown.

I have provided in my machine a slacking device, which is located at or near the forward ends of the bars 90 of the cam track, and said slacking device is arranged to operate between the matching faces of the bars 90, as best seen in Fig. 1. This slacking device is composed of a pair of radially extended arms 105 attached to a hub secured on a shaft 106 which has bearing in a standard or bracket 107 supported upon the foundation of the machine, and on the shaft 106 is carried a sprocket wheel 108 which is similar to the sprocket wheels 5 around which the chains 6 are carried, and the sprocket wheel 108 is carried by its shaft above one of the chains 6, as seen in Fig. 1, so that in the operation of the said chains, the sprocket wheel 108 will also be operated and it in turn will transmit a corresponding motion to the slacking device carried by the said shaft. On the outer ends of the arms 105 are secured the members 109, which in transverse cross section are concave, to conform to the surface of the sausage casing. The members 109 of the slacking device just referred to, are so timed in their movement, and with respect to the movement of the plates 7, on the chains 6, that the members 109 will engage with the sausage casing, as seen in Fig. 6, intermediate each of the plates 7, so as to produce a sufficient slack in the sausage casing, that when the same is twisted, by means of the twisting mechanism, it will not break in the twisting. The twisting mechanism in its operation on the casing, taking up the slack and producing sufficient twists in the casing, so that the casing may relax after it is released by the twisting mechanism and the jaws of the plates, and not untwist the same. The twisting device is so arranged on the machine that the forward and rear jaws of the plates 7 may engage with the casing before the members 109 will engage with the casing, as seen in Fig. 6. In Fig. 1 the twisting mechanism is just about completing a twist of the sausage casing and when the same is returned it will engage with a portion of the casing which is shown beneath the slacking device and intermediate the rear jaws of one plate and the forward jaws of the succeeding plate, the twisting mechanism not operating until the forward jaws of the plate to the right of the twisting device engage with the sausage casing, substantially in the manner as indicated by the rear jaws of the plates to the left of the twisting device.

To the support 86 at the forward end of the machine, is attached a plate 110 which is carried upwardly and forwardly from the said support, see Fig. 6 and located beneath the path in which the slacking device rotates. When slack has been produced in the sausage casing and the same is carried through the machine, that portion of the casing will ride up and over the plate 110, the plate serving to guide the slacked portion of the sausage casing into a position where both of the belts of the twisting mechanism will engage the casing simultaneously.

At the rear end of the machine, or that end where the sausage casing is delivered after the twists have been made to produce links referred to, I provide on the shaft 2 a device which is somewhat similar to the slacking device, composed of arms 111 supported by a hub secured to the said shaft and to which are connected or formed a part thereof, members 112, these members, as seen in Fig. 6, serving to receive that portion of the casing intermediate the plates 7 and assists in the delivery of the casing from the machine. There has been no means shown for feeding the stuffed casing to my machine, but it is understood that it is intended to feed the same thereto, as it is delivered from a stuffer, and that as the casing is delivered from the machine, some suitable carrier is provided for taking the casing away. These devices form no part of the invention herein and for this reason have not been illustrated.

In Figs. 26 and 27, I have shown in place of the roller 33 coöperating with the belt 31, two rollers. These rollers are indicated as 113 and 114, carried by short spindles similar to the roller 33 which are suitably journaled on the frames 22 and 23. The roller 113 is arranged by gravity to remain in contact with the belt 31 and the roller 114 is by means of springs 115 held in contact with the belt 32. The object of this construction is to provide for the continuous engagement of the belts 31 and 32 with a sausage casing having uniform or irregular portions which may be passed through the machine. It is well known that a sausage casing when filled is not usually of uniform dimension, and were some means not provided for causing the belts to remain in constant engagement with the sausage casing, the adjustment might be such that the belts would only engage with a casing of a given dimension, but with the provision of rollers such as shown in Figs. 26 and 27, I am enabled to keep the plates in constant engagement with the sausage casing, whether it be of uniform dimension or not. For imparting power to the shaft 21, which operates to reciprocate the support carrying the twisting mechanism, I employ a pinion 116 on the shaft 21 which meshes with the gear 46 on the shaft 2, see Fig. 5.

Attention is called to the delivering device carried on the shaft 2, which receives the twisted portions of the sausage casing. It is understood that if, as the sausage casing after being twisted, is delivered from the machine without being supported in some suitable way that there will be a great liability of the sausage untwisting itself and while I guard against this, in the manner in whch I do the twisting, yet the members 112 on the shaft 2 receive the twisted portions of the casing as the casing is delivered from the plates, see Fig. 6, so that there is no interval of time between the delivery of the twisted casing from the machine to a suitable carrier in which the casing would have an opportunity of untwisting itself. So long as the casing is resting upon something, there is little or no possibility of its becoming untwisted, and it is not until it is removed from its support that the danger of its untwisting arises, so that with the use of the revoluble member on the shaft 2, I obviate this danger.

While I have shown the bars or rods 100 and 103, of the plates 7, as being operated by springs to separate or return them to their normal and inoperative positions, yet I do not wish to confine myself to this particular arrangement as it may be found convenient to do away with the springs on the bars or rods, and operate them somewhat in the manner as previously described and then separate the same during their engagement with some means either in the frame or supported in some other manner.

Having thus fully described my invention, what I claim and desire to secure by Letters Patent of the United States, is:—

1. In a device of the character described, a support, a carrier mounted on said support, a slacking device for producing slack in material moved by said carrier, and twisting mechanism for subsequently twisting the material.

2. In a device of the character described, a support, an endless carrier mounted on said support, a slacking device for producing slack in material moved by said carrier, and twisting mechanism for subsequently twisting the material.

3. In a device of the character described, a support, a carrier mounted on said support, a rotating slacking device for producing slack in material moved by said carrier, and twisting mechanism for subsequently twisting the material.

4. In a device of the character described, a support, an endless carrier mounted on said support, a rotating slacking device for producing slack in material moved by said carrier, and twisting mechanism for subsequently twisting the material.

5. In a device of the character described, a support, a carrier mounted on said support, a slacking device for producing slack in material moved by said carrier, and twisting mechanism carried by a movable support for subsequently twisting the material.

6. In a device of the character described, a support, an endless carrier mounted on said support, a slacking device for producing slack in material moved by said carrier, and twisting mechanism carried by a movable support for subsequently twisting the material.

7. In a device of the character described, a support, an endless carrier mounted on said support, a revoluble slacking device for producing slack in material moved by said carrier, and twisting mechanism carried by a movable support for subsequently twisting the material.

8. In a device of the character described, a support, a carrier mounted on said support, a slacking device mounted at or near one end thereof for producing slack in the material moved by said carrier, and twisting mechanism for subsequently twisting the material.

9. In a device of the character described, the combination of a carrier, a slacking device operatively mounted above the path of the carrier, and twisting mechanism movable across the path of the carrier above and below the same and adapted to be moved at intervals with said carrier, and returned.

10. In a device of the character described, the combination of a carrier comprising endless chains and a series of plates connected at intervals thereto, a slacking device operatively mounted above the path of the plates of the carrier, and twisting mechanism movable across the path of the carrier above and below the same.

11. In a device of the character described, the combination of a carrier comprising endless chains, and a series of plates connected at intervals thereto, a revoluble slacking device having portions adapted to coincide with the space between the plates during the movement of the carrier, and twisting mechanism movable transversely to the movement of the carrier.

12. In a device of the character described, the combination of a carrier comprising endless chains and a series of plates connected at intervals thereto, a slacking device having portions adapted to coincide with the space between the plates during the movement of the carrier, and transversely operated twisting mechanism carried by a movable support.

13. In a device of the character described, the combination of a carrier comprising endless chains and a series of plates connected at intervals thereto, a revoluble slacking device having portions adapted to coincide with the space between the plates during the movement of the carrier, and transversely operated twisting mechanism carried by a movable support.

14. In a device of the character described, the combination of a carrier comprising endless chains and a series of plates connected at intervals thereto, a slacking device mounted above the path of the plates and capable of being operated by one of said chains, and twisting mechanism movable transversely of the carrier and capable of acting on a sausage casing after the operation of the slacking device thereon.

15. In a device of the character described, the combination of a carrier comprising endless chains and a series of plates connected at intervals thereto, a revoluble slacking device capable of producing slack in a sausage casing moved by the carrier, means for operating the slacking device from the chains, and twisting mechanism movable transversely of the carrier and capable of acting on a sausage casing after the operation of the slacking device thereon.

16. In a device of the character described, the combination of a carrier comprising endless chains and a series of plates connected at intervals thereto, a revoluble slacking device adapted to operate on a casing between said plates, means for operating the slacking device from the chains, and twisting mechanism movable in opposite directions above said plates.

17. In a device of the character described, the combination of a carrier for advancing continuously a filled sausage casing, a slacking device adapted to act on said casing prior to its being twisted, twisting mechanism carried by a movable support and capable of acting on said casing during the movement of the support in one direction and means for moving said support toward and from the slacking device.

18. In combination with a carrier for receiving and advancing a filled sausage casing, of means coöperating with said carrier adapted to engage said casing at intervals for producing slack therein.

19. In combination with a carrier for advancing a filled sausage casing, means coöperating with said carrier adapted to engage said casing at intervals for producing slack therein, and twisting mechanism adapted to engage the slacked portion of the sausage casing.

20. In combination with a carrier for advancing a filled sausage casing, a revoluble member coöperating with said carrier adapted to engage said casing at intervals for producing slack therein, and traveling twisting means adapted to engage the slacked portion of said sausage casing.

21. In a device of the character described, the combination of a carrier for advancing a filled sausage casing, a series of plates carried by and spaced apart on said carrier to receive said casing, and a slacking device adapted to engage said casing intermediate said plates.

22. In a device of the character described, the combination of a carrier for advancing a filled sausage casing, a series of plates carried by and spaced apart on said carrier to receive said casing, a slacking device adapted to engage said casing intermediate said plates, and twisting mechanism adapted to engage the slacked portion of said casing.

23. In a device of the character described, the combination of a carrier for advancing a filled sausage casing, a series of plates carried by and spaced apart on said carrier to receive said casing, a slacking device adapted to engage said casing intermediate said plates, twisting mechanism consisting of an upper and a lower member each movable transversely of the carrier, a movable support for said twisting mechanism, and means for moving said support toward and from the slacking device, said twisting mechanism adapted to twist the casing during the movement of the support in one direction and be separated during the movement of the support in the opposite direction.

24. In a device of the character described, the combination of a traveling support for a filled sausage casing, a slacking device coöperating with said support and adapted to engage and produce slack in said casing at intervals, twisting mechanism consisting of an upper and a lower member each movable at right angles to said support, and means for moving the twisting mechanism toward and from the slacking device, said twisting mechanism adapted to twist the casing when moving toward the slacking device and be separated during its movement away from said slacking device.

25. In a device of the character described, the combination of a traveling support for a filled sausage casing, a pair of belts movable transverse to the direction of movement of the support and located above and below the same, and means for moving the said belts at intervals in the direction of movement of said support, said belts adapted to engage and twist the sausage casing when moving in the direction of movement of said support and to be separated when moving in the opposite direction.

26. In a device of the character described, the combination of a traveling support for a filled sausage casing, a slacking device coöperating with said support and adapted to engage and produce slack in said casing at intervals, a pair of belts movable transverse to the direction of movement of the support and located above and below the same, and means for moving said belts at intervals in the direction of movement of said support, said belts adapted to engage and twist the sausage casing when moving in the direction of movement of said support and to be separated when moving in the opposite direction.

27. In a device of the character described, the combination of a longitudinally movable support for receiving and advancing a filled sausage casing, a pair of coöperating twisting devices movable transversely to said support, means for bringing the twisting devices adjacent to each other during the forward travel of the support, and means for separating said twisting devices during their return movement.

28. In a device of the character described, the combination of a movable support for a filled sausage casing, means located in the path of movement of said casing for producing slack in said casing, a pair of coöperating twisting devices movable transverse to the movement of said support and above and below the same, means for advancing the twisting devices intermittently with and at the same speed of the movable support and means for bringing said twisting devices into engagement with the slacked portions of said casing during the forward movement of said twisting devices and separating the same therefrom during the rearward movement of said support.

29. In a device of the character described, the combination of a series of spaced plates connected to travel in unison, a pair of longitudinal and spaced bars lying in the path of travel of said plates having dissimilar cam engaging portions, a pair of jaws mounted on the ends of each plate, the inner matching ends of corresponding jaws being normally held spaced apart, the forward jaws adapted to engage certain of the cam portions of the bars aforesaid and the rearward jaws adapted to engage certain other of said cam portions of said bars, to facilitate in bringing said jaws in proximity to each other during the travel of the plates.

30. A traveling support for a filled sausage casing consisting of a series of spaced plates suitably connected, each of said plates provided with a central longitudinal groove serving as a receptacle for said casing, and jaws in the opposite ends of the plates adapted at intervals during the travel of said plates to engage with the casing supported thereby.

31. In a device of the character described, the combination of a traveling support for a filled sausage casing, comprising a series of spaced plates suitably connected, movable jaws on each end of said plates, each of said plates having a central longitudinal groove serving as a receptacle for said casing, means for engaging that portion of said casing intermediate each of the plates for producing slack therein, a reciprocating support, and twisting mechanism carried thereby adapted to engage the slacked portion of said casing as it is produced.

32. In a device of the character described, the combination of a carrier adapted to support a filled sausage casing at intervals, twisting mechanism extending transversely of the carrier, means located in the path of travel of said casing for producing slack in the casing prior to the operation of the twisting mechanism, and a revoluble member adapted to receive the twisted portions of said casing, as said casing is delivered from the carrier.

33. In a device of the character described, the combination of an endless carrier adapted to support a filled sausage casing, of intervals, twisting mechanism extending transversely of the carrier, means located in the path of travel of said casing for producing slack in the casing prior to the operation of the twisting mechanism, and a revoluble member adapted to receive the twisted portions of said casing, as said casing is delivered from the carrier.

34. In a device of the character described, the combination of an endless carrier, adapted to support a filled sausage casing at intervals, twisting mechanism extending transversely of the carrier, means located in the path of travel of said casing rotating in an endless orbit for producing slack in the casing, prior to the operation of the twisting mechanism, and a revoluble member adapted to receive the twisted portions of said casing as said casing is delivered from the carrier.

35. In a device of the character described, the combination of an endless carrier, adapted to support a filled sausage casing at intervals, twisting mechanism extending transversely of the carrier mounted on a reciprocal support, means located in the path of travel of said casing and rotating in an endless orbit for producing slack in the casing, prior to the operation of the twisting mechanism, and a revoluble member adapted to receive the twisted portions of said casing as said casing is delivered from the carrier.

36. In a device of the character described, the combination of an endless carrier comprising chains to which are connected at intervals plates serving as supports for a filled sausage casing, twisting mechanism extending transversely of the carrier, means located in the path of travel of said casing and rotating in an endless orbit adapted to engage the casing between the plates for producing slack in the same prior to the operation of the twisting mechanism, and a revoluble member adapted to receive the twisted portions of the casing as said casing is delivered from the carrier.

37. In a device of the character described, the combination of an endless carrier, for advancing a filled sausage casing, a support through which said carrier operates, mechanism for reciprocating said support in opposite directions during the movement of the carrier, twisting mechanism mounted on said support and adapted to operate on portions of said casing, and means for producing slack in the casing prior to the operation of the twisting mechanism.

38. In a device of the character described, the combination of an endless carrier for a filled sausage casing, a support through which said carrier operates, means for reciprocating said support in opposite directions during the movement of the carrier, twisting mechanism carried on said support and comprising belts located above and below the carrier, means for bringing said belts in contact with the casing and operating upon the same during the movement of the support in the direction of movement of the carrier, means for separating the plates when the support is being moved in the opposite direction, and mechanism for producing slack in said casing, prior to the engagement thereof by said belts.

39. A sausage twisting machine, comprising an endless carrier, said carrier including a plurality of spaced plates for supporting a sausage casing during its travel with the carrier, means at the opposite ends of said plates for gripping said casing, means operating in advance of said casing gripping means for producing slack therein, and means adapted to engage the casing intermediate each of said plates for twisting said casing during the movement of said carrier.

40. A sausage twisting machine, comprising a traveling support for receiving and advancing a sausage casing, means on said carrier for gripping said casing at intervals during its travel with the carrier, means operating in advance of and between certain of said casing gripping means for producing slack in the casing prior to engagement of the gripping means therewith, and mechanism timed to travel with said carrier and movable transversely thereof for twisting said casing at intervals and after the engagement of said casing by the gripping means.

41. A sausage twisting machine, comprising a plurality of spaced traveling plates for receiving and advancing a sausage casing, gripping means for said casing disposed at opposite ends of said plates, means for operating the gripping means at one end of said plates in advance of the operation of the gripping means of the opposite ends thereof, means for slacking said casing at intervals and in advance of the operation of the gripping means on said plates, and transversely operated means for engaging and twisting portions of said casing during its travel with said plates.

42. A sausage twisting machine, comprising an endless carrier for receiving and advancing a sausage casing, a plurality of sets of gripping means mounted upon the carrier for engaging said casing during the travel of the carrier, means for slacking said casing in advance of the operation of the gripping means and during the movement of the casing with the carrier, a traveling support capable of being moved with said carrier for a short distance and at the same speed therewith, and returned, twisting means movable with said support, and comprising oppositely movable members disposed above and below the travel of said casing for engaging the casing during the forward movement of the support to twist that portion of said casing engaged by said members, means for bringing the twisting means into action during the forward movement of its support, and means for separating said twisting means during a reverse movement of said support.

In testimony whereof I affix my signature, in presence of two witnesses.

GEORGE J. TROMPETER.

Witnesses:
 CHAS. N. LA PORTE,
 ROBERT N. MCCORMICK.